United States Patent
Shibata et al.

(10) Patent No.: US 7,565,942 B2
(45) Date of Patent: Jul. 28, 2009

(54) VEHICLE DRIVE CONTROL SYSTEM AND METHOD

(75) Inventors: Misawo Shibata, Kariya (JP); Yukihiro Yamashita, Takahama (JP)

(73) Assignee: Denso Corporation, Kariya (JP)

( * ) Notice: Subject to any disclaimer, the term of this patent is extended or adjusted under 35 U.S.C. 154(b) by 403 days.

(21) Appl. No.: 11/653,854

(22) Filed: Jan. 17, 2007

(65) Prior Publication Data

US 2007/0205030 A1  Sep. 6, 2007

(30) Foreign Application Priority Data

Mar. 6, 2006  (JP)  ............................. 2006-060262

(51) Int. Cl.
*B60K 6/04* (2006.01)
(52) U.S. Cl. ...................... 180/243; 180/65.3; 180/65.4
(58) Field of Classification Search ................ 180/65.2, 180/65.3, 65.4, 242, 243
See application file for complete search history.

(56) References Cited

U.S. PATENT DOCUMENTS

| | | | | |
|---|---|---|---|---|
| 5,716,213 A | * | 2/1998 | Clark et al. ................. | 434/322 |
| 5,999,864 A | * | 12/1999 | Thiel et al. ..................... | 701/22 |
| 6,338,391 B1 | * | 1/2002 | Severinsky et al. ........ | 180/65.23 |
| 6,816,759 B2 | * | 11/2004 | Kimura ....................... | 701/22 |
| 7,152,705 B2 | * | 12/2006 | Alster et al. ........... | 180/65.245 |
| 7,182,168 B2 | * | 2/2007 | Kamata et al. .............. | 180/242 |
| 2003/0037977 A1 | * | 2/2003 | Tatara et al. ................ | 180/65.3 |
| 2005/0211489 A1 | * | 9/2005 | Kowatari et al. ........... | 180/243 |
| 2006/0196714 A1 | * | 9/2006 | Sugimoto et al. ........... | 180/242 |

FOREIGN PATENT DOCUMENTS

JP  2004-169644  6/2004

\* cited by examiner

*Primary Examiner*—Tony H. Winner
(74) *Attorney, Agent, or Firm*—Nixon & Vanderhye, PC

(57) ABSTRACT

In a drive control system for a hybrid vehicle, the electric power generated by an alternator driven by an engine and the electric power regenerated by a motor-generator are stored in a battery. The battery discharges electric energy to drive the motor-generator. An ECU calculates fuel consumption of the engine and fuel consumption of the motor-generator, and determines a distribution of motive power between the engine and the motor-generator from the fuel consumptions. The ECU calculates fuel consumption contributing to the electric energy stored in the battery, and then calculates the fuel consumption of the motor-generator by reflecting the contributing fuel consumption in it.

10 Claims, 13 Drawing Sheets

VEHICLE DRIVE CONTROL SYSTEM AND METHOD

CROSS REFERENCE TO RELATED APPLICATION

This application is based on and incorporates herein by reference Japanese Patent Application No. 2006-60262 filed on Mar. 6, 2006.

FIELD OF THE INVENTION

The present invention relates to vehicle drive control system and method.

BACKGROUND OF THE INVENTION

A hybrid vehicle has an internal combustion engine and an electric motor as motive power sources for driving. For example, such a hybrid vehicle travels selectively in an engine-driven mode, a motor-assisted mode, or a charging mode. In the engine-driven mode, only the engine power drives the vehicle. In the motor-assisted mode, both the engine power and the motor power drive the vehicle. In the charging mode, the vehicle travels while its battery is charged by the electric power generated by the motor.

For example, Japanese Patent No. 3662904 discloses a system for switching the foregoing modes in accordance with the residual power, that is, state of charge (SOC), of the battery of such a hybrid vehicle so that the driving force necessary for driving the vehicle can be shared suitably between the engine and motor of the vehicle. In the motor-assisted mode, this system selects the motor driving force ratio, which is highest in the efficiency of fuel consumption, with respect to electric power consumption. In the charging mode, this technique selects the motor driving force ratio highest in the efficiency of fuel consumption with respect to electric power generation. This system determines the motor-assisted mode, the charging mode or another mode in accordance with the residual power of the battery by means of a map. This system also determines the motor driving force as a parameter with which the fuel consumption in the engine can be reduced most.

However, the energy efficiency during motor drive also varies with the amount of fuel consumed when the battery is charged by the electric power generated by the motor. This reduces the accuracy in energy efficiency calculation, because the amount of fuel consumed at the time of electric power generation is not taken into consideration. The reduction in accuracy limits the driving force from being shared properly between the engine and the motor. As a result, it is impossible to reduce the fuel consumption optimally.

SUMMARY OF THE INVENTION

A primary object of the present invention is to provide drive control system and method that can optimize the efficiency of a hybrid vehicle having an internal combustion engine and a motor-generator as motive power sources.

According to one aspect of the present invention, a vehicle has an internal combustion engine and an electric motor-generator as motive power sources, at least one of which drives it. The vehicle also has an electric generator for generating electric power by being driven by the engine. The vehicle further has a battery for storing electric energy. The electric power generated by the generator and the electric power regenerated by the motor-generator cause electric energy to be stored in the battery. The battery discharges electric energy to drive the motor-generator.

The drive control system calculates a first fuel consumption as an amount of fuel consumed to drive the engine, a second fuel consumption as an amount of fuel consumed to drive the motor-generator, and determines a distribution of motive power between the engine and the motor-generator from the first and second fuel consumptions. In particular, in the second fuel consumption calculation, a fuel consumption contributing to the electric energy stored in the battery is calculated, and then the second fuel consumption is calculated by reflecting the contributing fuel consumption.

Thus, a second fuel consumption as an amount of fuel consumed to drive the motor-generator is so calculated as to reflect a fuel consumption contributing to the electric energy stored in the battery. This improves the accuracy in calculating the second fuel consumption. Specifically, for example, even when fuel is consumed for the generator to generate electric power in order to charge the battery, a second fuel consumption as an amount of fuel consumed to drive the motor-generator can be calculated properly by taking into account the amount of fuel consumed when the power is generated. The improved calculation accuracy makes it possible to distribute motive power appropriately between the engine and the motor-generator, thereby optimizing the efficiency of the vehicle.

BRIEF DESCRIPTION OF THE DRAWINGS

The above and other objects, features and advantages of the present invention will become more apparent from the following description made with reference to the accompanying drawings. In the drawings.

DETAILED DESCRIPTION OF THE PREFERRED EMBODIMENT

Figure 1:
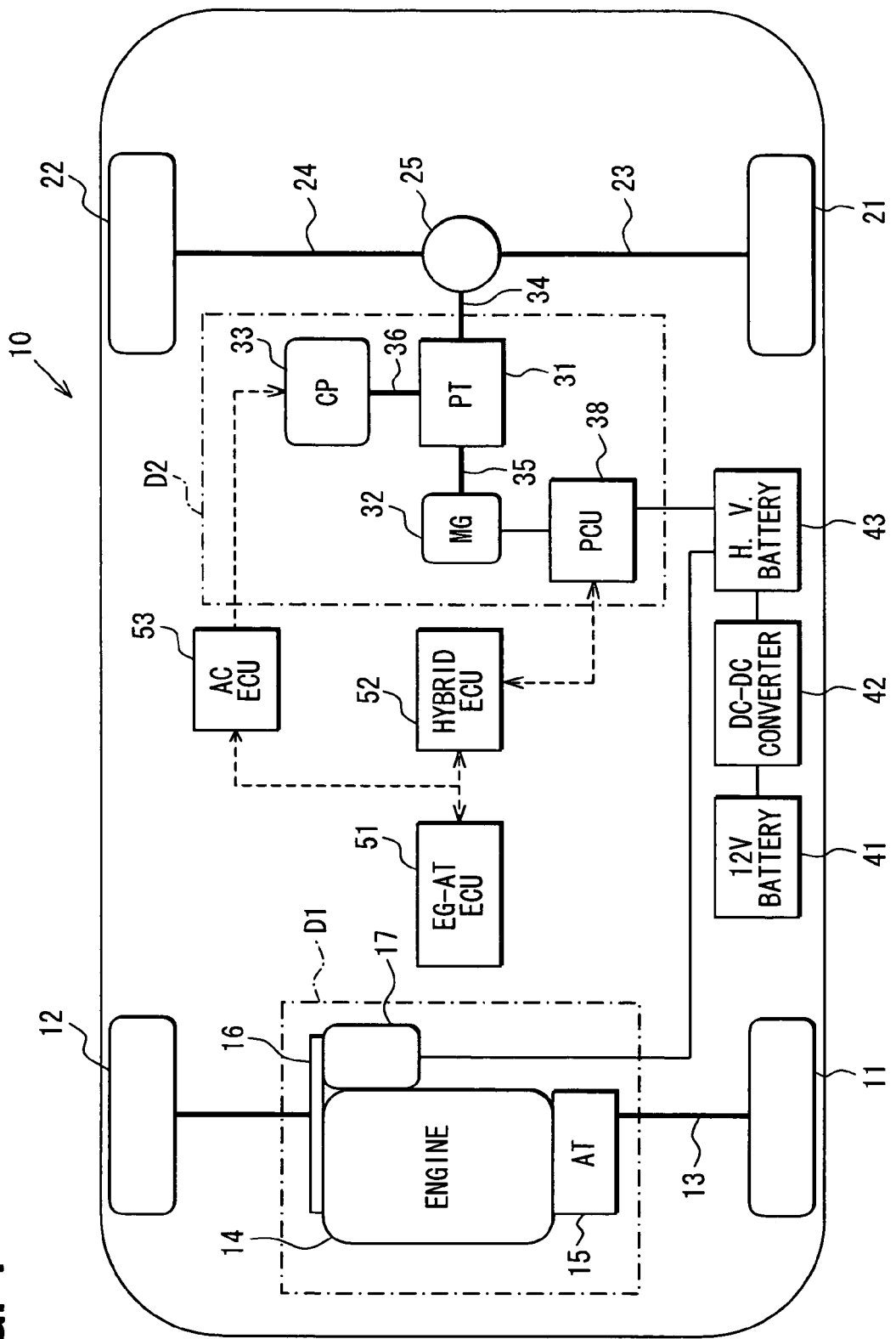
FIG. 1 is a schematic diagram of a vehicle system in an embodiment of the present invention.

Referring first to FIG. 1, a hybrid vehicle 10 has a main motive power block D1 as a first motive power generating unit, which is positioned near front wheels 11 and 12, and an auxiliary motive power block D2 as a second motive power generating unit, which is positioned near rear wheels 21 and 22. The motive power blocks D1 and D2 generate motive power for driving the vehicle 10.

The front wheels 11 and 12 as main driving wheels are connected to a front axle 13, which is connected to the main motive power block D1. The main motive power block D1 includes an internal combustion engine (EG) 14 as a main motive power source and an automatic transmission (AT) 15. The engine 14 generates motive power by burning gasoline, light oil or other fuel. The transmission 15 includes a torque converter and speed change gears. The output from the engine 14 is transferred through the transmission 15 to the front axle 13, so that the front wheels 11 and 12 rotate. The output shaft of the engine 14 is connected to an alternator 17 as an electric generator by a belt or other connecting device 16.

The rear wheels 21 and 22 as auxiliary driving wheels are connected to a pair of rear axles 23 and 24 respectively, between which a differential gear 25 is interposed. The differential gear 25 is connected to the auxiliary motive power block D2 through a driving shaft 34. The auxiliary motive power block D2 includes a power transfer (PT) 31, which includes a planetary gear train, an electric motor-generator (MG) 32 as an auxiliary motive power source, and an air conditioner compressor (CP) 33 as an auxiliary machine. The power transfer 31 is connected to the motor-generator 32 and the compressor 33 by a driving shaft 35 and a driving shaft 36, respectively. The motor-generator 32 may be an alternating synchronous motor-generator. The motor-generator 32 functions as both a motor, which can be driven by electric power supply (a powering function), and a generator, which converts mechanical energy into electric energy (a regenerating function). The motor-generator 32 is connected to a power conversion unit (PCU) 38, which may be an electric inverter. The power conversion unit 38 converts DC power into AC power.

For convenience, the three driving shafts 34-36, which are connected to the power transfer (planetary gear train) 31, may be referred to as the differential gear connecting shaft 34, MG connecting shaft 35, and compressor connecting shaft 36, respectively.

The power supply system includes a battery 41, a DC-DC converter 42, and a high-voltage battery 43 as an electricity storing device. The rated voltage of the battery 41 is 12 volts. The DC-DC converter 42 includes a voltage decreasing circuit and a voltage increasing circuit. The high-voltage battery 43 is connected to the alternator 17 of the main motive power block D1 and the power conversion unit 38 of the auxiliary motive power block D2.

The vehicle system also has electronic control units (ECUs), which control the driving of actuators etc. based on the values sensed by sensors (not shown) etc. The electronic control units are an EG-AT ECU 51, a hybrid ECU 52, and an air conditioner (AC) ECU 53. The EG-AT ECU 51 has engine controlling structure and function and transmission controlling structure and function. The EG-AT ECU 51 suitably performs engine control such as fuel injection control and ignition timing control based on operating conditions etc. of the engine 14. The ECU 51 also suitably performs the switching control of the gears (AT range) of the transmission 15. The hybrid ECU 52 controls the whole vehicle. That is, it controls the driving, generating and other conditions of the motor-generator 32 by outputting control signals to the power conversion unit 38. The AC ECU 53 performs air conditioning control by driving the compressor 33 based on instructions from the driver, travel conditions of the vehicle 10, etc. Each of the ECUs 51-53 has mainly of a well-known microcomputer, which comprises a CPU, a ROM, a RAM, etc. Control data etc. can be transferred among the ECUs 51-53.

Figure 2:
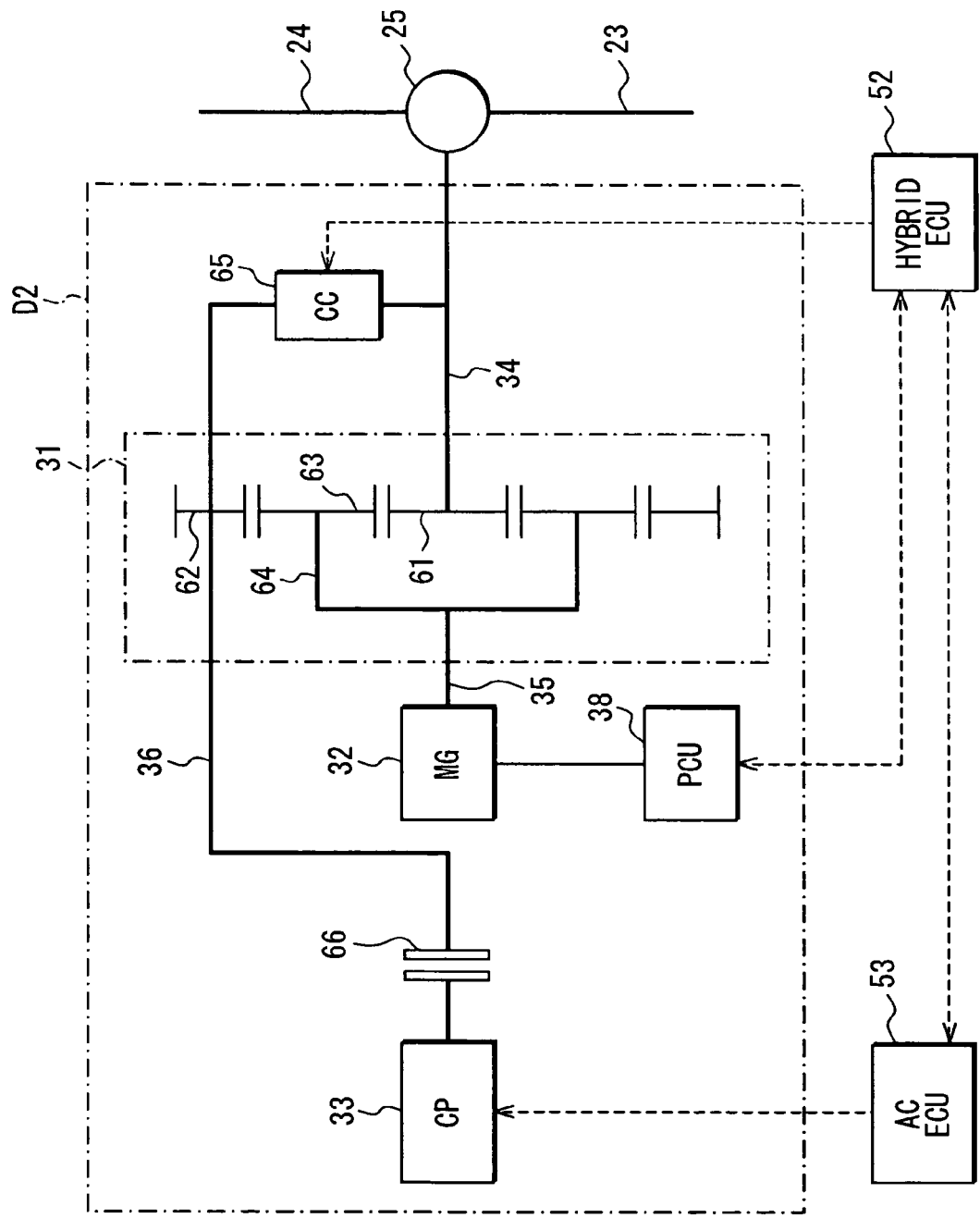
FIG. 2 is a schematic diagram of an auxiliary motive power block.

As shown in FIG. 2, the power transfer (planetary gear train) 31 includes a sun gear 61, a ring gear 62, and a carrier 64, which carries pinions 63. The sun gear 61 and ring gear 62 rotate on a common axis. The pinions 63 are in mesh with the sun gear 61 and ring gear 62 and rotate on their own axes while revolving around the sun gear 61. The sun gear 61, ring gear 62, and carrier 64 are connected to the differential gear connecting shaft 34, compressor connecting shaft 36, and MG connecting shaft 35, respectively.

A direct coupling clutch (CC) 65 as a switching device is interposed between the differential gear connecting shaft 34 and compressor connecting shaft 36. The direct-coupling clutch 65 may be an on/off clutch and can be engaged or disengaged in accordance with a command from the hybrid ECU 52. The direct-coupling clutch 65 may be replaced with a one-way clutch or a centrifugal clutch.

When the direct-coupling clutch 65 is engaged, the motive power from the differential gear connecting shaft 34 is transferred through the compressor connecting shaft 36 to the compressor 33, and the driving shafts 34-36 rotate at the same speed. When the direct-coupling clutch 65 is disengaged, the differential gear connecting shaft 34 and compressor connecting shaft 36 are disconnected, so that each of the driving shafts 34-36 rotates at a speed based on the planetary gear ratio p of the planetary gears of the power transfer 31. The planetary gear ratio p is the number of sun gear teeth divided by the number of ring gear teeth.

The compressor connecting shaft 36 is fitted with a compressor clutch 66, which can be engaged or disengaged in accordance with the state of an air conditioner switch (not shown) etc. Actually, the compressor clutch 66 is integral with the compressor 33 and can be engaged or disengaged in accordance with a command output from the AC ECU 53 to the compressor 33.

While the vehicle 10 is traveling, the motive power input from the differential gear connecting shaft 34 drives the motor-generator 32 and compressor 33, thereby enabling the air conditioner etc. to operate. While the vehicle 10 is decelerating or in other conditions, the motive power from the differential gear connecting shaft 34 causes the motor-generator 32 to perform regenerative electric power generation, so that the batteries are charged through the power conversion unit 38. While the vehicle 10 is not traveling or is in other conditions, the motive power of the motor-generator 32 enables the compressor 33 to operate. The motive power generated by the motor-generator 32 is transferred through the power transfer 31 to the differential gear 25 and further to the rear wheels 21 and 22, so that the vehicle 10 can be driven by the motive power of the motor-generator 32 solely or in combination with the motive power of the engine 14.

Thus, the vehicle 10 can travel in a two-wheel drive (2 WD) mode, in which it is driven by the motive power generated by either the engine 14 or the motor-generator 32. It can also travel in a four-wheel drive (4 WD) mode, in which it is driven by the motive power generated by both the engine 14 and the motor-generator 32.

Figure 3:
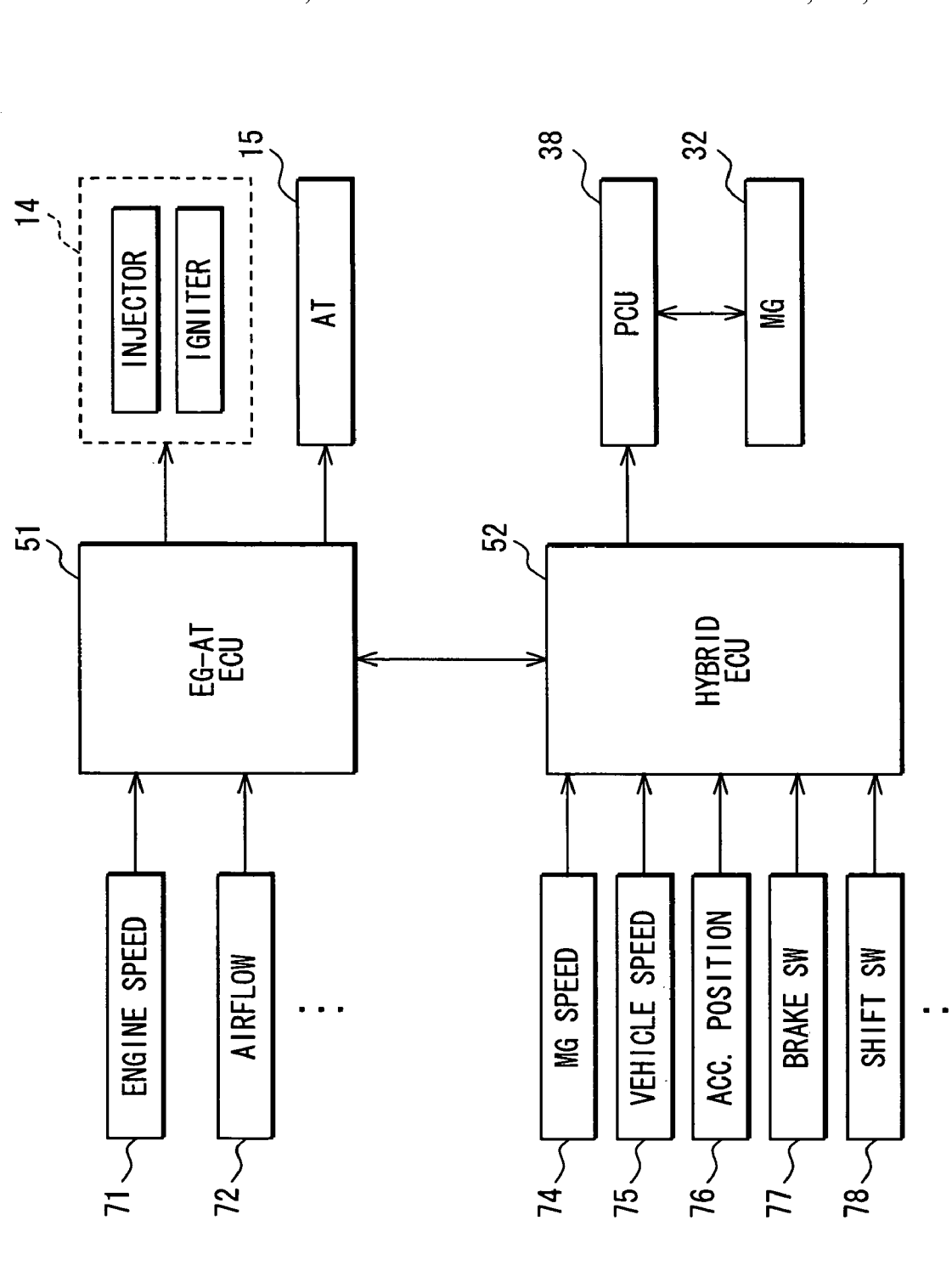
FIG. 3 is a block diagram of a control system of the vehicle system.

With reference to FIG. 3, the EG-AT ECU 51 is connected to an engine speed sensor 71, an air flow meter 72, and other sensors for sensing various operating conditions of the engine. The engine speed sensor 71 senses the rotational speed of the engine 14. The air flow meter 72 senses the amount of air supplied into the engine 14. These sensors etc. output signals to the EG-AT ECU 51. The hybrid ECU 52 is connected to an MG speed sensor 74, a vehicle speed sensor 75, an accelerator position sensor 76, a brake switch 77, a speed change gear shift switch 78, and other sensors and switches for sensing various travel conditions etc. of the vehicle 10. The MG speed sensor 74 senses the rotational speed of the motor-generator 32. The vehicle speed sensor 75 senses the travel speed of the vehicle 10. The accelerator position sensor 76 senses the driver's accelerating operation. The brake switch 77 senses the driver's braking operation. The speed change switch 78 senses the gears of the transmission 15. These sensors and switches output signals to the hybrid ECU 52. The ECUs 51 and 52 share all the foregoing information therebetween.

Based on the signals output from the sensors etc., the EG-AT ECU 51 controls the fuel injection by an injector of the engine 14, the ignition timing of an igniter of the ignition system, the automatic speed change by the automatic transmission 15, etc. The hybrid ECU 52 controls the driving and regenerating conditions etc. of the motor-generator 32 through the power conversion unit 38.

Figure 4:
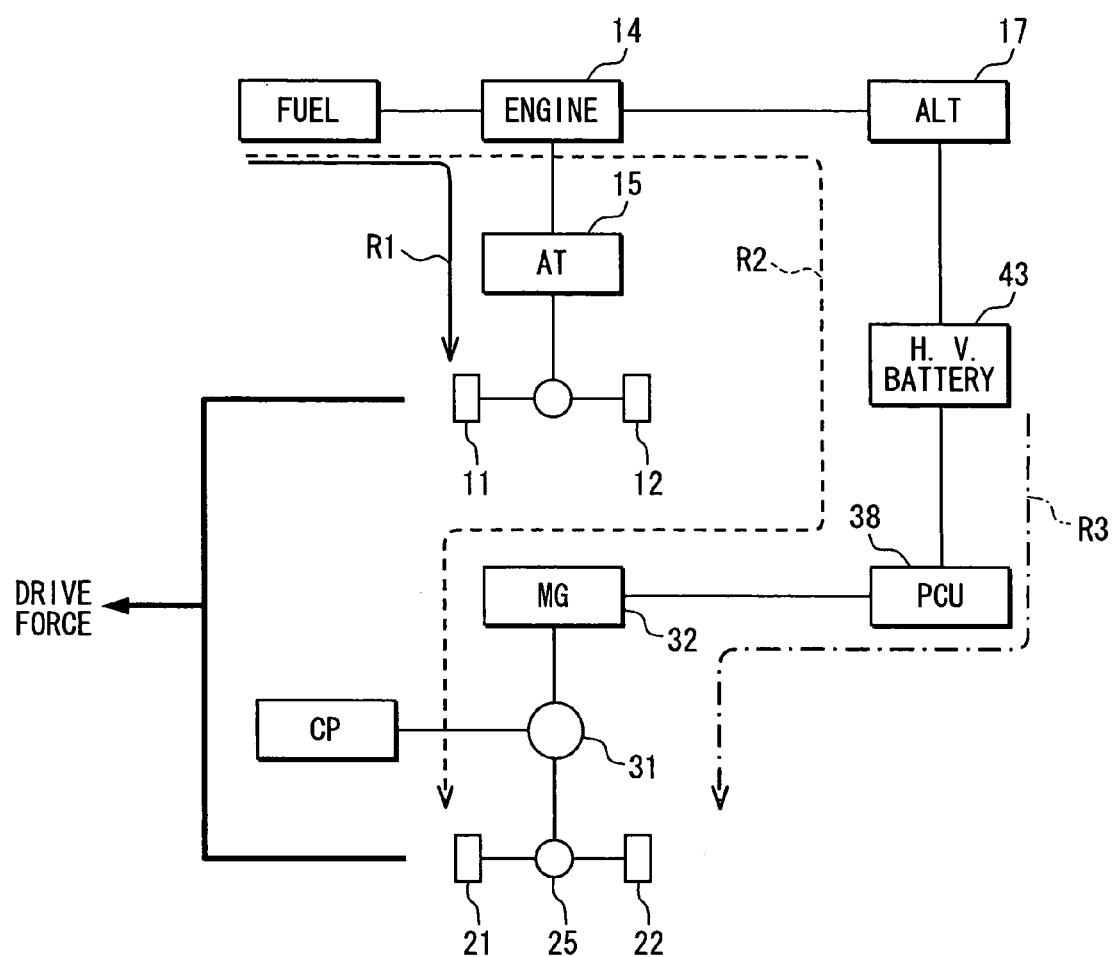
FIG. 4 is a conceptual diagram of energy consumption in the vehicle system.

The fuel consumption (energy efficiency) of the vehicle system is shown in FIG. 4 as flow of energy consumption in the vehicle system. When the vehicle 10 is driven only by the motive power of the engine 14 (engine-driven travel), fuel burns in the engine, so that the engine produces torque for driving the front wheels 11 and 12. In this case, energy (fuel) is consumed conceptually along a route R1, so that the vehicle 10 travels.

It is conceivable that the electric energy employed while the vehicle 10 is driven by the motive power of the motor-generator 32 in a motor-assisted travel condition, an EV travel condition, or another condition is consumed along two routes. The electric power generation by the alternator 17 charges the high-voltage battery 43. The electric energy stored consequently in the high-voltage battery 43 can be employed to activate the motor-generator 32 so that the vehicle 10 can travel. In this case, energy (fuel) is consumed conceptually along a route R2, so that the vehicle 10 travels.

The regenerative electric power of the motor-generator 32 charges the high-voltage battery 43. The electric energy stored consequently in the high-voltage battery 43 can be employed to activate the motor-generator 32 so that the vehicle 10 can travel. In this case, energy is consumed conceptually along a route R3. Energy of the high-voltage battery 43 is also consumed while the air conditioner is operating with its compressor 33 being driven by the motor-generator 32.

In the vehicle 10, the operation of the engine 14 consumes energy at the front wheels 11 and 12, and the operation of the motor-generator 32 consumes energy at the rear wheels 21 and 22. The sum of the energy consumption at the front wheels and the energy consumption at the rear wheels is the energy consumption in the whole vehicle system. It is possible to save energy by so determining the distribution of motive power between the front and rear wheels as to minimize the energy consumption in the whole vehicle system.

The fuel consumption in the whole vehicle can be calculated from an amount of fuel consumed by the operation of the engine 14 (engine fuel consumption) and an amount of fuel consumed by the driving of the motor-generator 32 (MG fuel consumption). The distribution of motive power between the engine 14 and the motor-generator 32 (distribution of torque between the front and rear wheels) is so determined as to minimize the fuel consumption in the whole vehicle. In particular, the battery efficiency can be calculated as fuel consumption contributing to the electric energy stored in the high-voltage battery 43. The MG fuel consumption can be so calculated as to reflect the battery efficiency. The engine fuel consumption and the MG fuel consumption are referred to as the first fuel consumption and the second fuel consumption, respectively.

Figure 5:
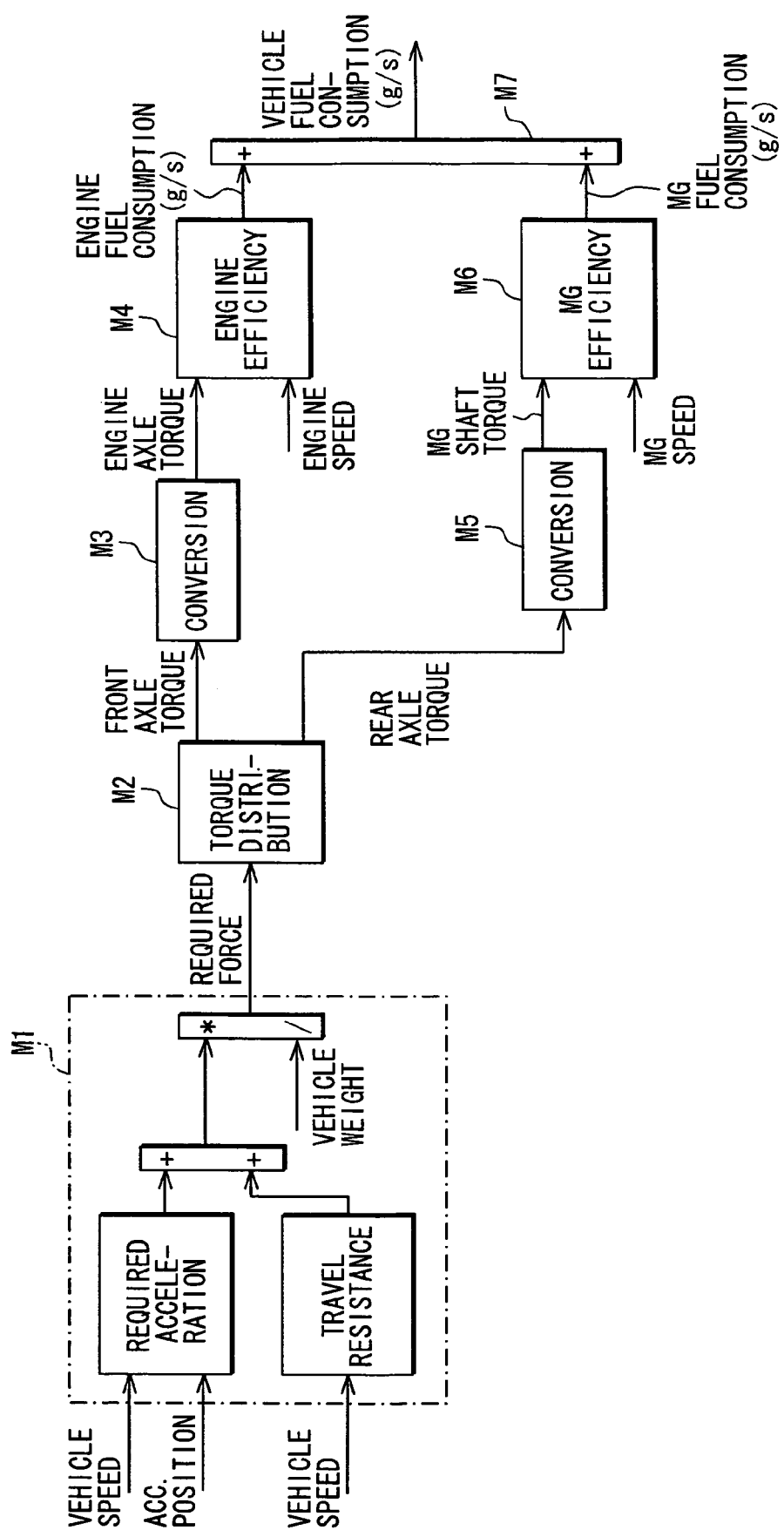
FIG. 5 is a function block diagram for the calculation of fuel consumption in the vehicle.
Figure 9:
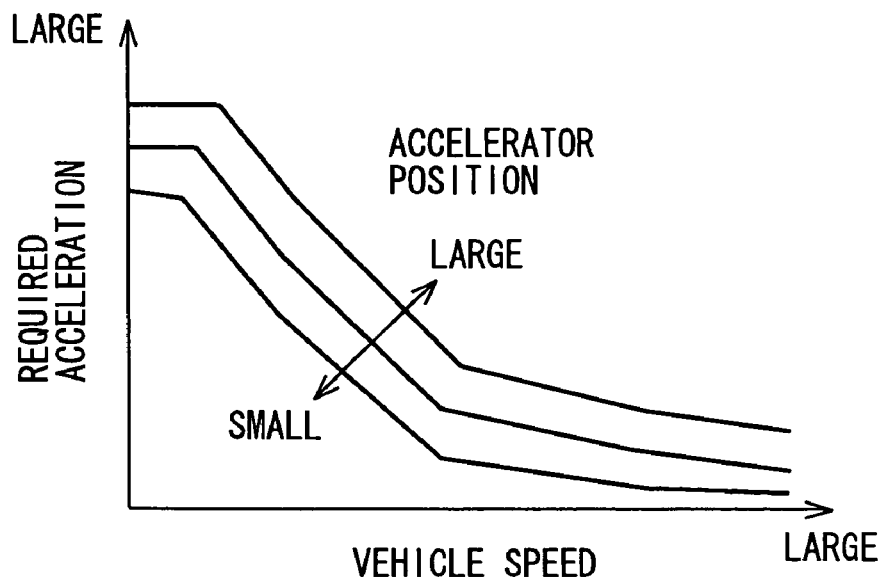
FIG. 9 is a required acceleration data map.

The fuel consumption in the whole vehicle as an energy efficiency of the vehicle system is calculated as shown in FIG. 5. A required driving force calculation unit M1 calculates a driver-required acceleration from the accelerator position and the vehicle speed as parameters by means of a required acceleration map. This calculation unit M1 also calculates a travel resistance to the vehicle 10 from the vehicle speed. On the required acceleration map, as shown in FIG. 9, required acceleration is defined and stored as a map data value that varies with the accelerator position and the vehicle speed. The calculation of the travel resistance is based on a travel resistance table made in advance or a mathematical formula. The calculation unit M1 finally calculates a required driving force from the weight of the vehicle 10 and the sum of the required acceleration and the travel resistance.

A torque distribution unit M2 calculates a front axle torque and a rear axle torque by distributing the required driving force at a preset ratio between the front and rear wheels. An engine shaft torque conversion unit M3 converts the front axle torque into an engine shaft torque by using, as parameters, the gear ratio and gear efficiency of the transmission 15 and the transmission efficiency of the torque converter. An engine efficiency calculation unit M4 calculates engine fuel consumption [gram per second (g/s)] from the engine shaft torque and the engine speed. The structure of this calculation unit M4 will be described in detail with reference to FIG. 6. An MG shaft torque conversion unit M5 converts the rear axle torque into an MG shaft torque by using the gear ratio and gear efficiency of the power transfer 31 as parameters. An MG efficiency calculation unit M6 calculates MG fuel consumption [g/s] from the MG shaft torque and the MG speed. The structure of this calculation unit M6 will be described in detail with reference to FIG. 7. A vehicle efficiency calculation unit M7 calculates fuel consumption [g/s] of the whole vehicle by adding the engine fuel consumption [g/s] and the MG fuel consumption [g/s] together.

Figure 6:
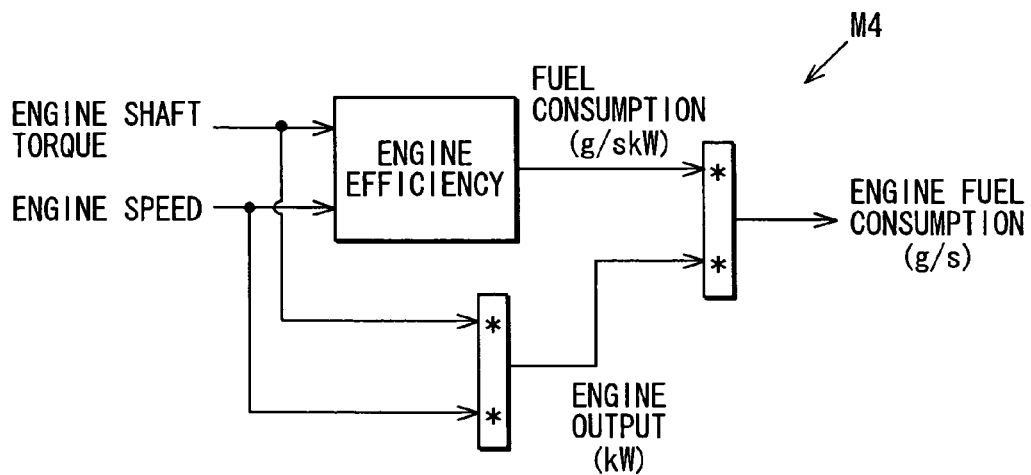
FIG. 6 is a block diagram of an engine efficiency calculation block.
Figure 10:
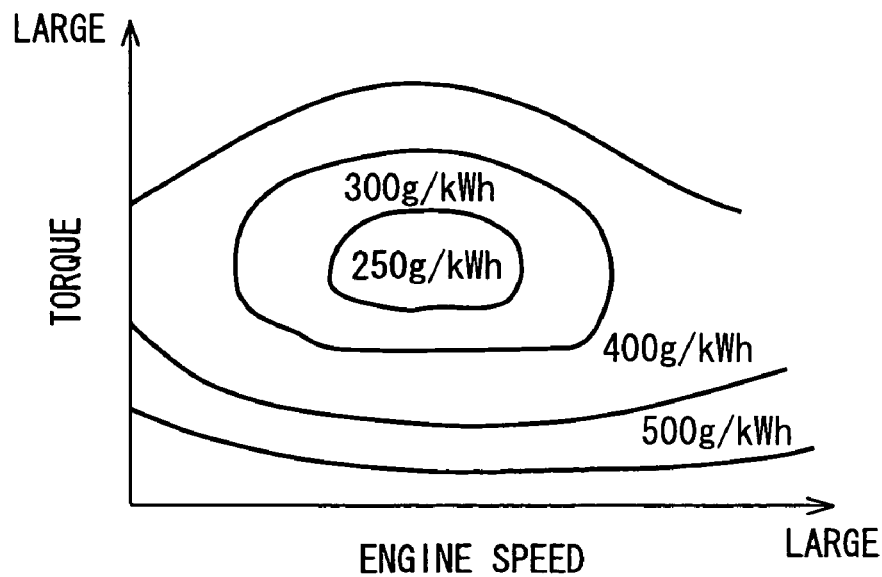
FIG. 10 is an engine efficiency data map.

As shown in FIG. 6, the engine efficiency calculation unit M4 calculates a rate of fuel consumption (engine efficiency) [g/s kW] of the engine 14 from the engine shaft torque and the engine speed as parameters by means of an engine efficiency map. On the engine efficiency map, as shown in FIG. 10, constant fuel consumption rate curves are plotted with the engine shaft torque and the engine speed. The engine efficiency calculation unit M4 also calculates an engine output [kW] from the engine shaft torque and the engine speed. By multiplying the rate of fuel consumption [g/s kW] and the engine output [kW] together, this calculation unit M4 calculates engine fuel consumption [g/s], which corresponds to the energy efficiency at the front axle.

Figure 7:
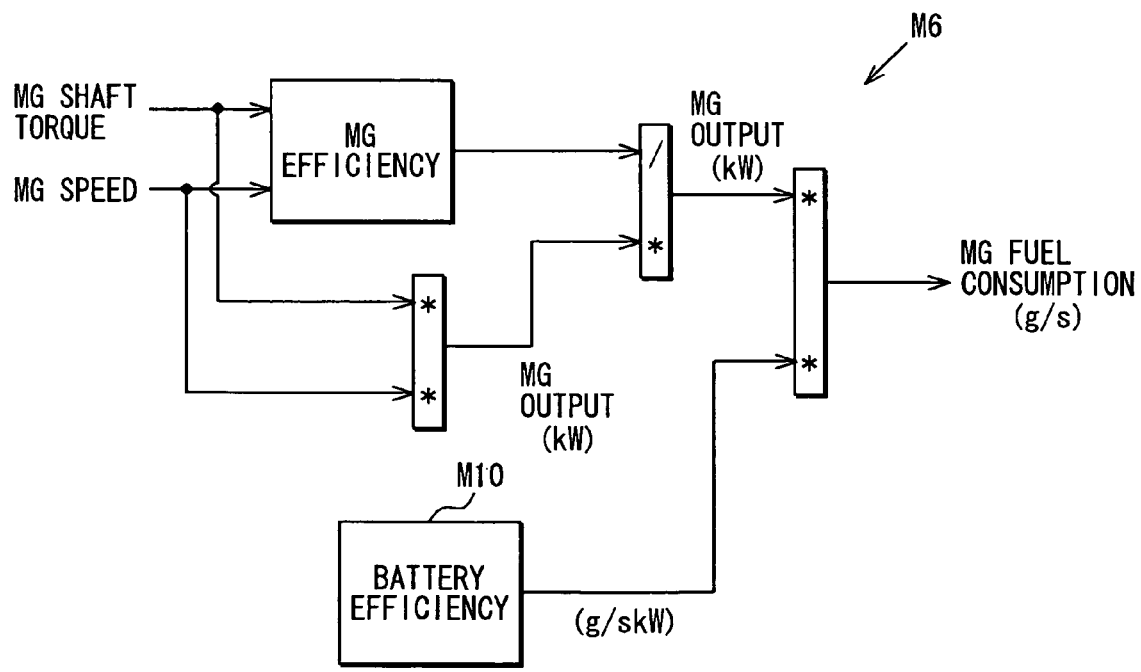
FIG. 7 is a block diagram of a motor-generator efficiency calculation block.
Figure 11:
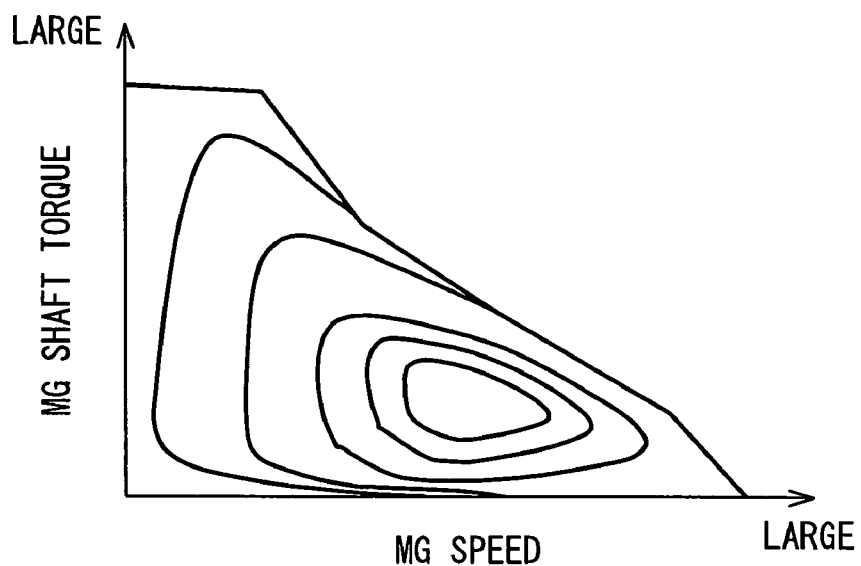
FIG. 11 is a motor-generator efficiency data map.

As shown in FIG. 7, the MG efficiency calculation unit M6 calculates MG driving efficiency from the MG shaft torque and the MG speed as parameters by means of an MG efficiency map. On the MG efficiency map, as shown in FIG. 11, MG driving efficiency is registered as a map value that varies with the MG shaft torque and the MG speed. This calculation unit M6 also calculates a base value [kW] of MG output from the MG shaft torque and the MG speed. By dividing the base value [kW] of MG output by the MG driving efficiency, the calculation unit M6 calculates an MG output [kW] as an electric power consumed by the motor-generator 32.

The MG efficiency calculation unit M6 includes a battery efficiency calculation unit M10, which calculates battery efficiency from the power balance of the high-voltage battery 43 and the fuel consumption for the electric power generation by the alternator 17. By multiplying the MG output and the battery efficiency together, the MG efficiency calculation unit M6 calculates MG fuel consumption [g/s], which corresponds to the energy efficiency at the rear axle.

When the alternator 17 generates electric power, the power generation adds the torque of the alternator 17 to the engine shaft torque, so that the operating point of the engine 14 changes. That is, the fuel consumption varies with the power generation. Therefore, an increase in fuel consumption per unit power generation (alternator power efficiency) is used as a parameter of power generation control. The alternator power efficiency can be calculated as follows. First, while the engine 14 is operating (while the vehicle 10 is traveling), calculations are performed of an amount of fuel (fuel consumption Q1) consumed with the alternator 17 generating electric power and an amount of fuel (fuel consumption Q2) consumed with the alternator generating no electric power. An increase in fuel consumption caused by the power generation is calculated from the difference between the fuel consumptions Q1 and Q2. Then, the alternator power efficiency (an increase in fuel consumption per unit power generation) is calculated by dividing the increase in fuel consumption caused by the power generation by the electric power generation by the alternator 17.

$$\text{alternator power efficiency } (g/s\ kW) = (Q1-Q2)/\text{generated electric power}$$

Figure 8:
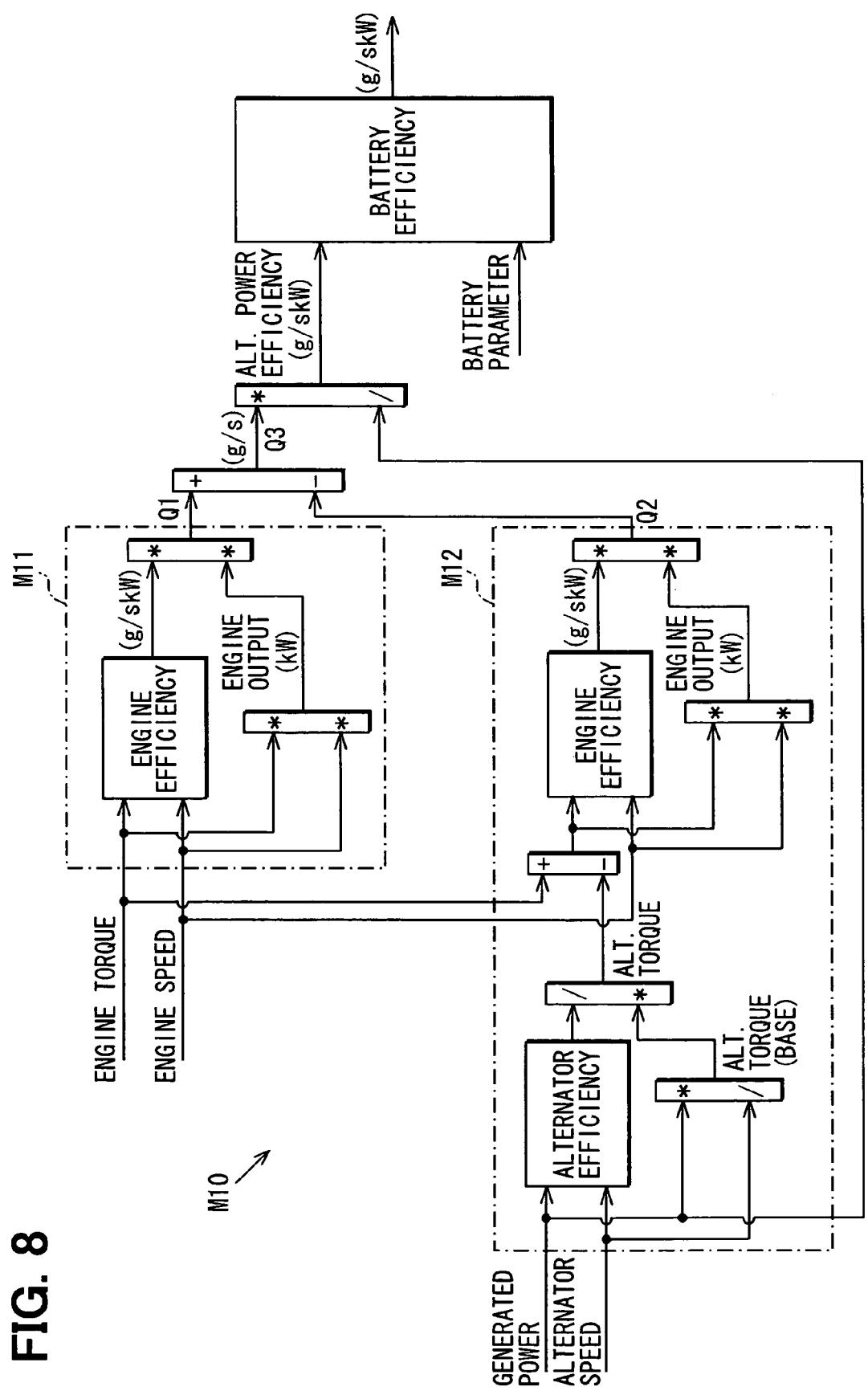
FIG. 8 is a block diagram of a battery efficiency calculation block.

The battery efficiency is calculated from the alternator power efficiency as a parameter. The structure of the battery efficiency calculation unit M10 is shown in FIG. 8. The battery efficiency calculation unit M10 includes two fuel consumption calculation units M11 and M12 for calculating fuel consumptions Q1 and Q2 respectively as the parameters from which the alternator power efficiency can be calculated. From the difference (Q1−Q2) between the fuel consumptions Q1 and Q2, this calculation unit M10 calculates fuel consumption Q3 equivalent to electric power generation by the alternator 17. By dividing the fuel consumption Q3 by the electric power generated by the alternator 17, the calculation unit M10 calculates alternator power efficiency (g/s kW).

The fuel consumption calculation unit M11 calculates a rate of fuel consumption [g/s kW] of the engine 14 from the engine shaft torque and the engine speed by means of the engine efficiency map (FIG. 10). This calculation unit M11 also calculates the engine output [kW] from the engine shaft torque and the engine speed. By multiplying the rate of fuel consumption [g/s kW] and the engine output [kW] together, the calculation unit M11 calculates an amount of fuel (fuel consumption Q1) [g/s] consumed when electric power is generated. The engine shaft torque includes the torque for the electric power generation by the alternator 17. Thus, the fuel consumption Q1 is calculated from parameters including the engine shaft torque.

Figure 12:
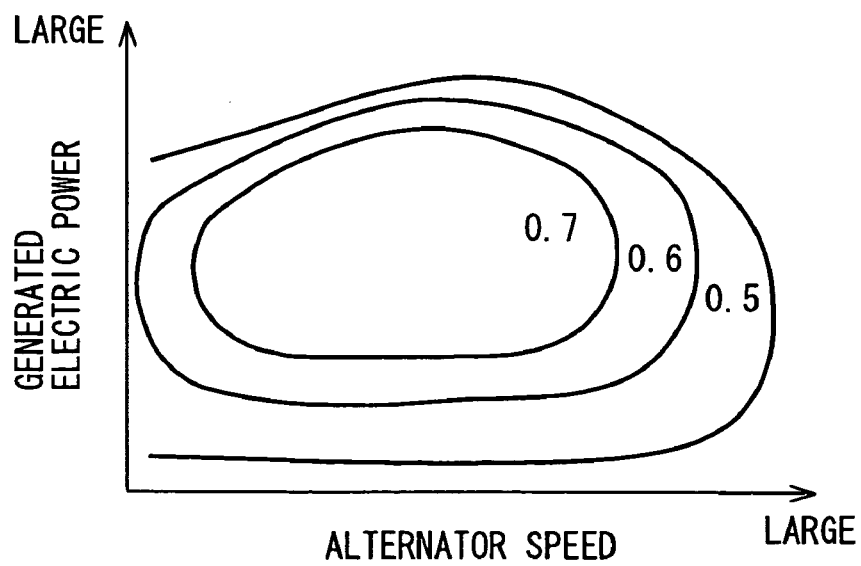
FIG. 12 is an alternator efficiency data map.

The fuel consumption calculation unit M12 calculates alternator efficiency from the electric power generated by the alternator 17 and the rotational speed of the alternator by means of an alternator efficiency map, which is shown in FIG. 12. This calculation unit M12 also calculates a base value of alternator torque from the electric power generated by the alternator 17 and the alternator speed, which is calculated from the engine speed. By dividing the base value of alternator torque by the alternator efficiency, the calculation unit M12 calculates an alternator torque.

The fuel consumption calculation unit M12 further calculates a torque difference by subtracting the alternator torque from the engine shaft torque. From the torque difference and the engine speed as parameters, this calculation unit M12 calculates a rate of fuel consumption [g/s kW] of the engine 14 and engine output [kW]. By multiplying the rate of fuel consumption [g/s kW] and the engine output [kW] together, the calculation unit M12 calculates the amount of fuel (fuel consumption Q2) [g/s] consumed when no electric power is generated. Thus, the fuel consumption Q2 is calculated from parameters including the torque difference calculated by subtracting the alternator torque from the engine shaft torque, which includes the torque for the electric power generation by the alternator 17.

By subtracting the fuel consumption Q2 from the fuel consumption Q1, the battery efficiency calculation unit M10 calculates an increase in fuel consumption [g/s] caused by the electric power generation. By dividing the increase in fuel consumption by the generated electric power, this calculation unit M10 calculates alternator power efficiency [g/s kW].

From the alternator power efficiency and battery parameters (residual power information, discharged power information, and charged power information) that represent battery conditions, the battery efficiency calculation unit M10 calculates a battery efficiency [g/s kW] according to the following Formula 1 expressed below. One of the battery parameters is a residual power of the high-voltage battery 43, which is calculated according to Formula 2 expressed below.

Formula 1:

$$\text{battery efficiency} = \frac{\begin{array}{c}\text{last battery efficiency} \times \\ (\text{last residual power})\text{discharged power} + \\ \text{last alternator power efficiency} \times \\ \text{charged power}\end{array}}{\text{residual power}}$$

Formula 2:

$$\text{residual power} = \int (\text{charged power} + MG \text{ regenerative power} - \text{discharged power})dt$$

Routines for calculating fuel consumptions in the vehicle system will be described below in detail with reference to the flowcharts of FIGS. 13-16.

Figure 13:
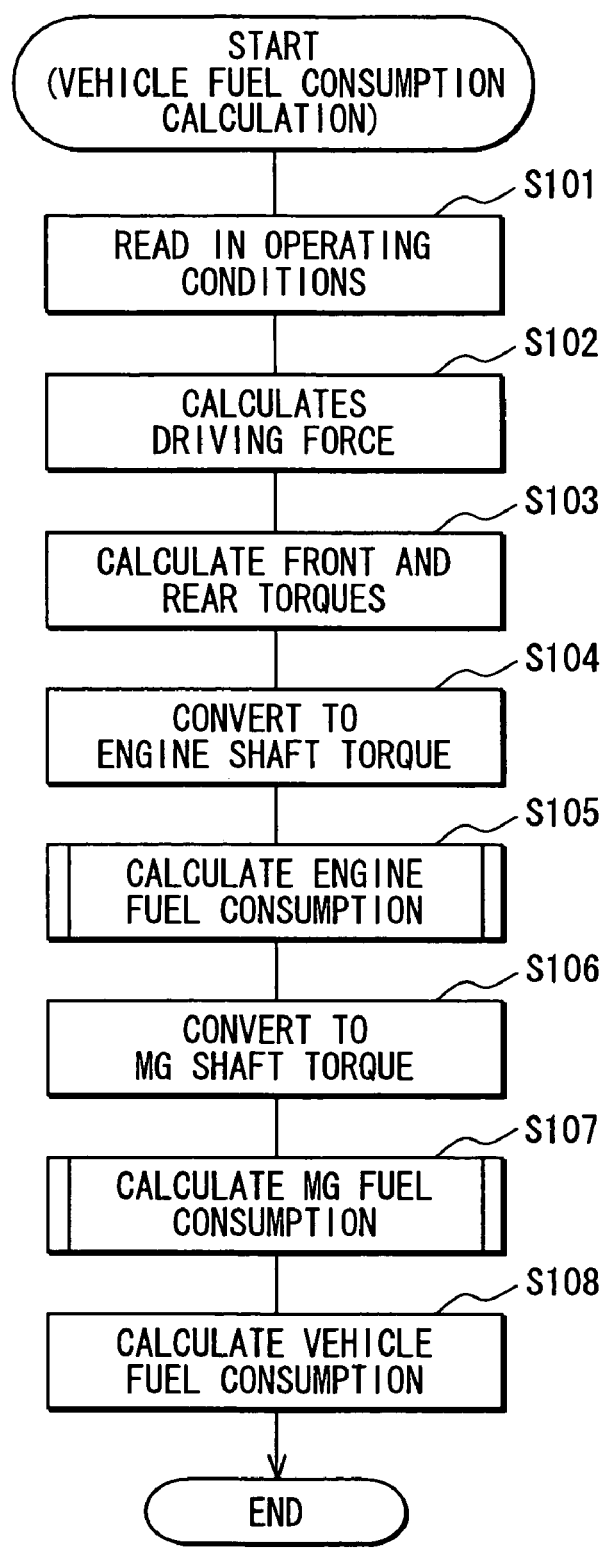
FIG. 13 is a flowchart of a routine for calculating fuel consumption in the vehicle.

FIG. 13 is a flowchart of the routine for calculating the fuel consumption in the whole vehicle. The hybrid ECU 52 performs this routine repeatedly, for example, in preset cycles.

With reference to FIG. 13, step S101 reads in the present operating conditions of the engine 14. Next step S102 calculates the required driving force from the driver-required acceleration and the travel resistance to the vehicle 10, which are calculated from the accelerator position and the vehicle speed as parameters, etc. Next step S103 calculates the front axle torque and the rear axle torque by distributing the calculated driving force at the preset ratio between the front and rear wheels.

Next step S104 converts the front axle torque into the engine shaft torque by using, as parameters, the gear ratio and gear efficiency of the transmission 15 and the transmission efficiency of the torque converter (engine shaft torque=front axle torque/(gear ratio×gear efficiency×torque converter transmission efficiency)). Next step S105 calculates the engine fuel consumption. This step S105 of calculating the engine fuel consumption is shown in FIG. 14 in detail.

Figure 14:
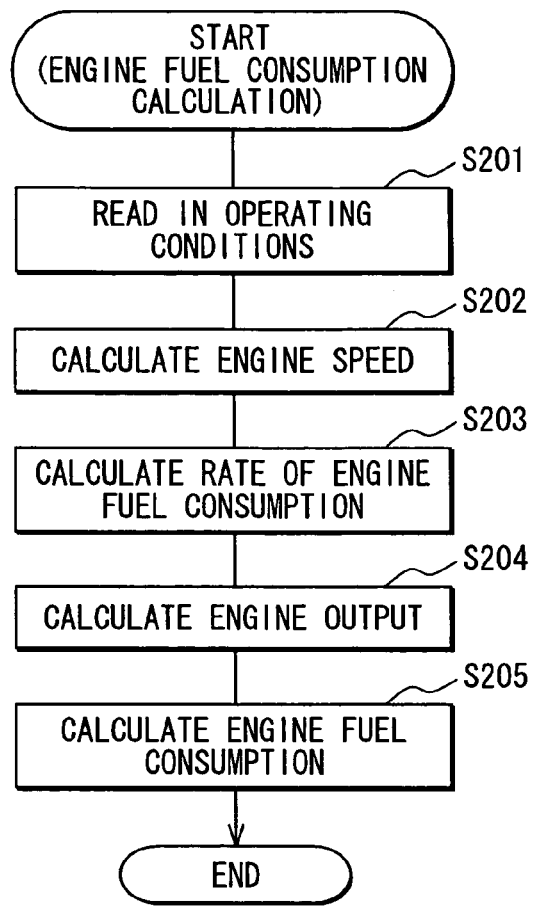
FIG. 14 is a flowchart of a routine for calculating engine fuel consumption.

With reference to FIG. 14, step S201 reads in the present operating conditions of the engine 14. Next step S202 calculate the present engine speed. Next step S203 calculates a rate of fuel consumption [g/s kW] of the engine 14 from the engine shaft torque and the engine speed as parameters by referring to the engine efficiency map. Next step S204 calculates the engine output [kW] by multiplying the engine shaft torque and the engine speed together. Next step S205 calculates the engine fuel consumption [g/s] by multiplying the rate of fuel consumption [g/s kW] of the engine 14 and the engine output [kW].

Referring back to FIG. 13, step S106 converts the rear axle torque into the MG shaft torque by using the gear ratio and gear efficiency of the power transfer 31 as parameters (MG shaft toque=rear axle torque/(gear ratio×gear efficiency)). Next step S107 calculates the MG fuel consumption. This step S107 of calculating the MG fuel consumption is shown in FIG. 15 in detail.

Figure 15:
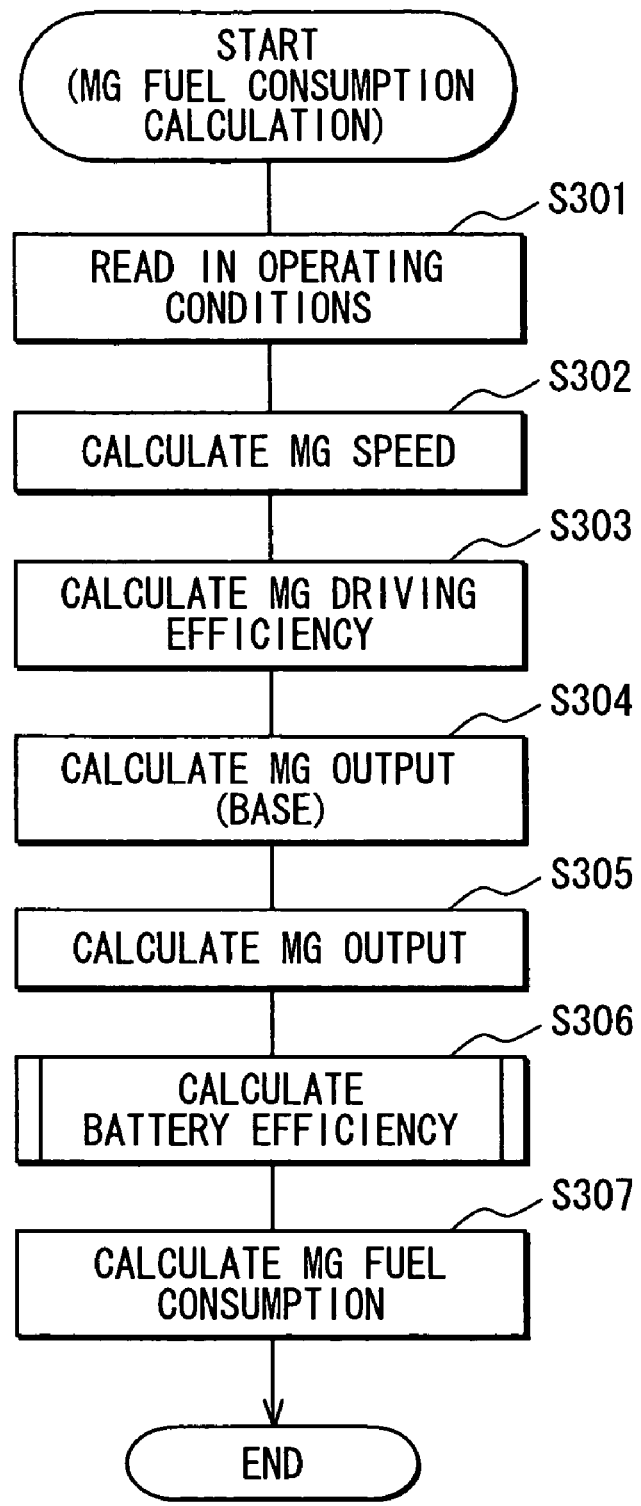
FIG. 15 is a flowchart of a routine for calculating generator-motor fuel consumption.

With reference to FIG. 15, step S301 reads in the present operating conditions of the motor-generator 32. Next step S302 calculates the present MG speed. Next step S303 calculates the MG driving efficiency [g/s kW] from the MG shaft torque and the MG speed as parameters by referring to the MG efficiency map. Next step S304 calculates the base value of MG output [kW] by multiplying the MG shaft torque and the MG speed together. Next step S305 calculates the MG output [kW] by dividing the base value of MG output [kW] by the MG driving efficiency. Next step S306 calculates the battery efficiency [g/s kW], as will be explained later on in detail. Final step S307 calculates the MG fuel consumption [g/s] by multiplying the MG output [kW] and the battery efficiency [g/s kW] together.

Referring back to FIG. 13, after calculating the MG fuel consumption, step S108 calculates the fuel consumption [g/s] in the whole vehicle by adding the engine fuel consumption [g/s] and the MG fuel consumption [g/s] together.

Figure 16:
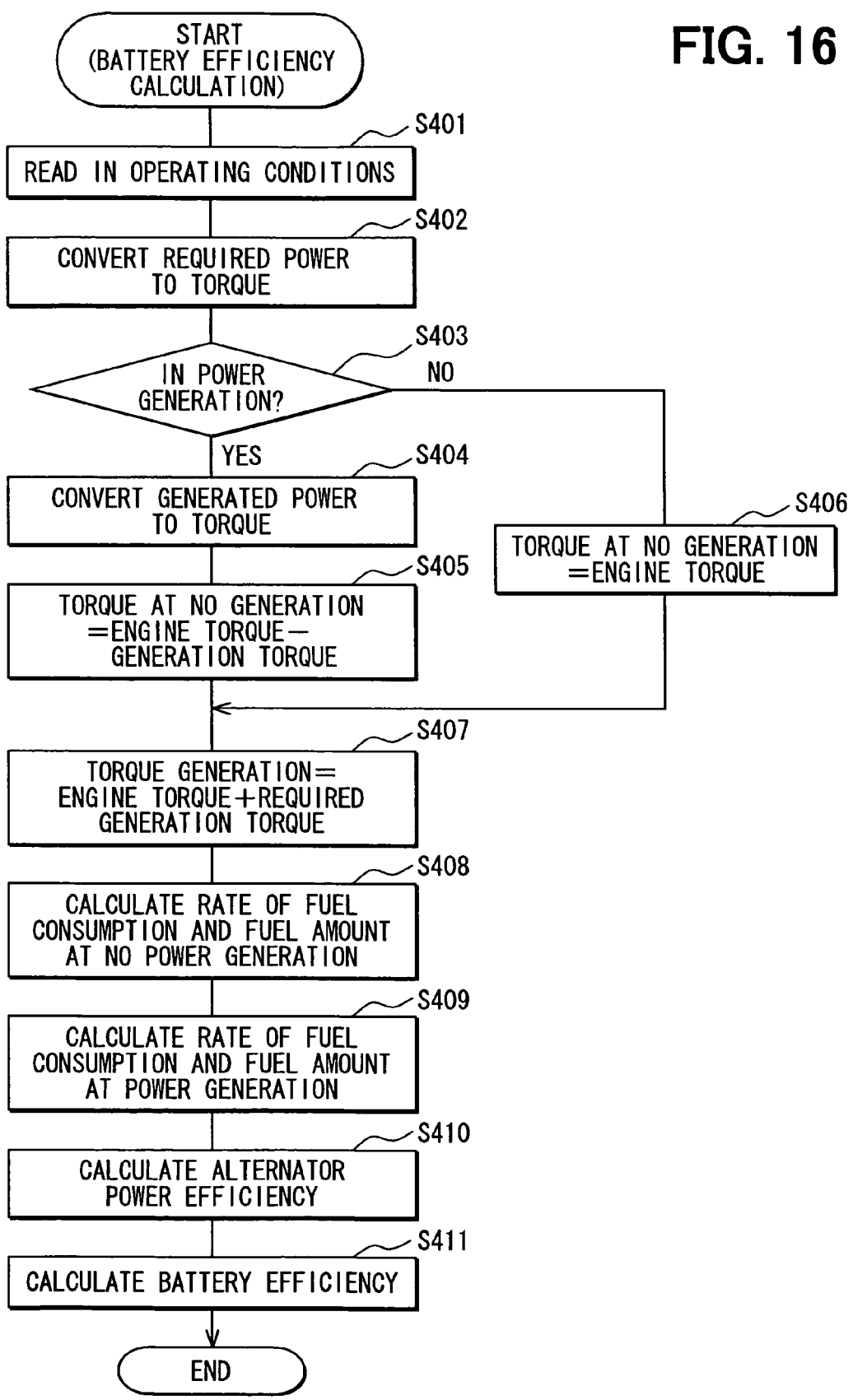
FIG. 16 is a flowchart of a routine for calculating battery efficiency.

The battery efficiency is calculated by a routine shown in FIG. 16. Step S401 reads in the present operating conditions. Next step S402 performs torque conversion of the required electric power generation, which is calculated from the maximum electric power that can be generated by the alternator 17, the power generation efficiency of the alternator, etc. The torque required for the required electric power generation is calculated.

Next step S403 determines whether the alternator 17 is generating electric power. If the alternator 17 is generating electric power, the routine goes to step S404, where the present electric power generation is converted into a torque. Next step S405 subtracts the present power generation torque from the present engine shaft torque so as to calculate the torque produced when no electric power is generated (torque produced when no electric power is generated=engine shaft torque−power generation torque). The torque produced when no electric power is generated corresponds to the engine shaft torque produced when the alternator 17 does not generate electric power. If the alternator 17 is not generating electric power, the routine goes to step S406, where the present engine shaft torque is made the torque produced when no electric power is generated.

The calculation of the torque produced when no electric power is generated is followed by step S407, where the torque produced when electric power is generated is calculated by adding the required electric power generation torque to the engine shaft torque. The torque produced when electric power is generated corresponds to the engine shaft torque produced when the alternator 17 generates electric power.

Next step S408 calculates the rate of fuel consumption [g/s kW] consumed when no electric power is generated, from the engine speed and the torque produced when no electric power is generated, by means of the engine efficiency map. Step S408 is also to calculate the amount of fuel [g/s] consumed when no electric power is generated, by multiplying together this rate of fuel consumption and the engine output [kW] generated when the alternator 17 does not generate electric power. Next step S409 calculates the rate of fuel consumption [g/s kW] consumed when electric power is generated, from the engine speed and the torque produced when electric power is generated, by means of the engine efficiency map. Step S409 is also to calculate the amount of fuel [g/s] consumed when electric power is generated, by multiplying this rate of fuel consumption and the engine output [kW] generated when the alternator 17 generates electric power.

Next step S410 calculates the alternator power efficiency [g/s kW], which is the fuel consumption per unit power generation, by dividing by the presently generated electric power [kW] the difference between the amount of fuel [g/s] consumed when electric power is generated and the amount of fuel [g/s] consumed when no electric power is generated. Final step S411 calculates the battery efficiency [g/s kW] according to Formula 1.

The fuel consumption [g/s] in the whole vehicle that is thus calculated by the processes of FIGS. 13-16 varies with the ratio of torque distribution between the front and rear wheels. Accordingly, the fuel consumption [g/s] in the whole vehicle is calculated for each of preset ratios of torque distribution between the front and rear wheels as a parameter. Then, the ratio of torque distribution for the minimum fuel consumption [g/s] (highest efficiency) is determined, and command torques (front axle torque and rear axle torque) for the front and rear wheels are calculated from the determined ratio.

Figure 17:
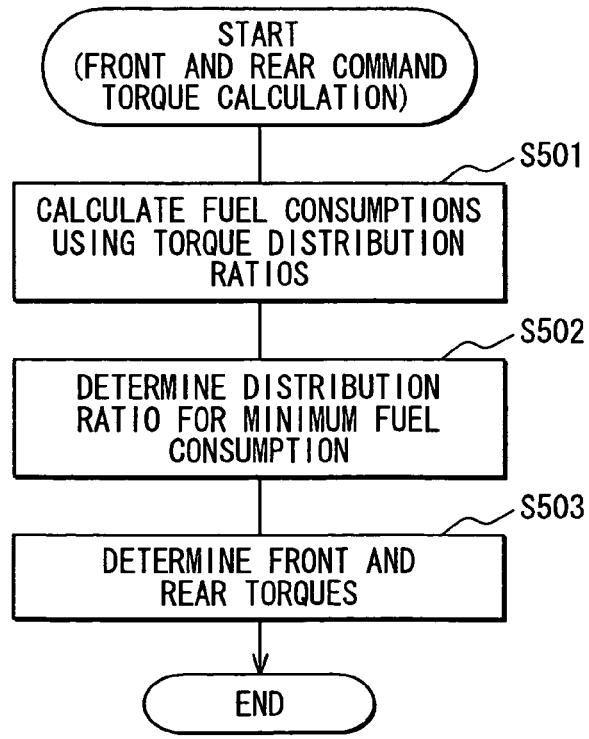
FIG. 17 is a flowchart of a routine for calculating front and rear command torques.

The command torque is calculated by a routine shown in FIG. 17. Specifically, step S501 calculates fuel consumptions (calculation of fuel consumptions in FIGS. 13 etc.) from the ratio of torque distribution between the front and rear wheels as a parameter. The calculation at this step includes calculating the engine fuel consumption and the MG fuel consumption, with the ratio of torque distribution varied by a preset value (for example, 10%) at a time. The calculation at this step also includes calculating the fuel consumption in the whole vehicle by adding the engine and MG fuel consumptions together. The ratio of torque distribution may be varied by 10% (for example, 0:100%, 10:90%, 20:80%, etc.), 20%, or any other value.

Next step S502 determines the ratio of torque distribution for the minimum of the fuel consumption [g/s] calculated for various ratios of torque distribution. Final step S503 calculates command torques (front axle torque and rear axle torque) for the front and rear wheels from the determined ratio of torque distribution.

According to the above embodiment, the calculation of the MG fuel consumption as an energy efficiency at the rear axles 23 and 24 includes calculating the battery efficiency as the fuel consumption contributing to the electric energy stored in the high-voltage battery 43. The MG fuel consumption is so calculated as to reflect the battery efficiency. This improves the accuracy in calculating the MG fuel consumption. For example, even when fuel is consumed for the alternator 17 to generate electric power in order to charge the high-voltage battery 43, it is possible to calculate the MG fuel consumption properly by taking into account the amount of fuel consumed when the power is generated. By thus improving the accuracy in calculating the MG fuel consumption, it is possible to distribute motive power appropriately between the engine 14 and motor-generator 32, thereby optimizing the efficiency of the whole vehicle.

The battery efficiency is calculated from the power balance of the high-voltage battery 43 as one parameter and the alternator power efficiency as another parameter, which is an increase in fuel consumption per unit power generation. This makes it possible to calculate the energy efficiency in conformity with the actual power generation.

The fuel consumption in the whole vehicle is calculated for each of the preset ratios of torque distribution between the front and rear wheels. Distribution of motive power between the engine 14 and motor-generator 32 is determined from the ratio of torque distribution for the minimum fuel consumption in the whole vehicle. This makes it possible to find an optimum ratio of torque distribution from the point of view of energy saving.

During the regeneration due to vehicle deceleration or the like, the motive power from the differential gear connecting shaft 34 is transferred through the power transfer 31 to the motor-generator 32. This makes it possible to recover regenerative energy efficiently. This is desirable construction in comparison with a general system for recovering regenerative energy through the transmission connected to an engine. The motor-generator 32 and compressor 33 are mounted in the rear portion of the vehicle 10, not the front portion of the vehicle, where the engine 14 is mounted. This simplifies the construction around the engine 14, thereby improving the mountability of the motive power sources and the auxiliary machine.

The differential gear connecting shaft 34, MG connecting shaft 35, and compressor connecting shaft 36 are connected mechanically by the power transfer 31, which is a planetary gear train. This makes it simple and easy to distribute motive power among the shafts 34-36, thereby simplifying the system configuration.

The present invention is not limited to the embodiment as described herein but may be embodied as follows.

In the calculation of the battery efficiency as the fuel consumption contributing to the electric energy stored in the high-voltage battery 43, the alternator 17 may generate electric power in consideration of the power balance between its power generation and the electric energy required for driving the motor-generator 32. In this case, it is preferable to optimize the fuel consumption (energy efficiency) while balancing the power generation and the electric energy with each other.

In the embodiment, while the ratio of torque distribution between the front and rear wheels is varied, for example, by 10% at a time, the ratio for the minimum fuel consumption in the whole vehicle is searched. Alternatively, the determination of a travel mode of the vehicle 10 might be based simply on the fuel consumption in the whole vehicle. For example, the fuel consumption in the whole vehicle in each of the engine-driven mode, motor-assisted mode, and EV mode might be calculated so that the mode for the minimum fuel consumption could be determined.

In the embodiment, as shown in FIG. 2, the differential gear connecting shaft (axle) 34, compressor connecting shaft 36, and MG connecting shaft 35 are connected to the sun gear 61, ring gear 62, and carrier 64, respectively, of the power transfer (planetary gear train) 31. However, the connecting combination might be varied. Specifically, each of the shafts 34-36 may be connected to any one of the sun gear 61, ring gear 62, and carrier 64.

In the embodiment, the front and rear wheels are the main and auxiliary driving wheels, respectively. Alternatively, the front and rear wheels might be the auxiliary and main driving wheels, respectively. For example, the engine 14 as the main motive power source may be mounted at the rear wheels 21 and 22, and the motor-generator 32 as the auxiliary motive power source may be mounted at the front wheels 11 and 12.

In the embodiment, because mainly the engine 14 drives the vehicle 10, the engine 14 and motor-generator 32 are the main and auxiliary motive power sources, respectively. Alternatively, the engine 14 and motor-generator 32 may be the auxiliary and main motive power sources, respectively. Both of the engine 14 and motor-generator 32 may be mounted in either the front portion or the rear portion of the vehicle 10.

What is claimed is:

1. A drive control system for a vehicle having an internal combustion engine as one motive power source, a motor-generator as another motive power source, a generator for generating electric power when driven by the engine, and a battery for storing electric energy, wherein the electric power generated by the generator and the electric power regenerated by the motor-generator cause electric energy to be stored in the battery, and wherein the battery discharges electric energy to drive the motor-generator, the drive control system comprising:
   a first fuel consumption calculating means for calculating first fuel consumption as an amount of fuel consumed to drive the engine;
   a second fuel consumption calculating means for calculating second fuel consumption as an amount of fuel consumed to drive the motor-generator; and
   a motive power distribution determining means for determining distribution of motive power between the engine and the motor-generator from the first and second fuel consumptions;
   wherein the second fuel consumption calculating means calculates contributing fuel consumption that contributes to the electric energy stored in the battery, and calculates the second fuel consumption by reflecting the contributing fuel consumption therein.

2. The drive control system of claim 1, wherein the second fuel consumption calculating means calculates the contributing fuel consumption from fuel consumption required for the electric power generation by the generator.

3. The drive control system of claim 1, wherein the second fuel consumption calculating means calculates the contributing fuel consumption from an increase in fuel consumption per unit power generation as one parameter based on electric power generation of the generator and an increase in fuel consumption caused by the electric power generation by the generator, and from power balance of the battery as another parameter.

4. The drive control system of claim 3, wherein the second fuel consumption calculating means further calculates a third fuel consumption as an amount of fuel consumed when the generator generates electric power and a fourth fuel consumption as an amount of fuel consumed when the generator does not generate electric power, and calculates the increase in fuel consumption from a difference between the third and fourth fuel consumptions.

5. The drive control system of claim 1, wherein the motive power distribution determining means presets ratios of motive power distribution between the engine and the motor-generator, calculates the first and second fuel consumptions at a plurality of ratios of motive power distribution, and determines the distribution of motive power between the engine and the motor-generator from one of the plurality of ratios for a minimum sum of the first and second fuel consumptions.

6. The drive control system of claim 1, wherein:

the vehicle further has a pair of front wheels, a front axle connecting the front wheels together, a pair of rear wheels, and a rear axle connecting the rear wheels together;

the engine is mounted at one of the axles; and the motor-generator is mounted at the other of the axles.

7. The drive control system of claim 6, wherein the vehicle further has a power transfer connecting the motor-generator and an auxiliary machine mechanically to the axle at which the motor-generator is mounted.

8. A drive control method for a vehicle having an internal combustion engine for driving the vehicle, a motor-generator for driving the vehicle and generating electric power, a generator for generating electric power, and a battery for storing electric energy, the method comprising:

calculating first fuel consumption as an amount of fuel consumed to drive the engine;

calculating contributing fuel consumption that contributes to the electric energy stored in the battery;

calculating second fuel consumption as an amount of fuel consumed to drive the motor-generator by reflecting the contributing fuel consumption therein; and determining distribution of motive power between the engine and the motor-generator from the first and second fuel consumptions.

9. The drive control method of claim 8, further comprising:

presetting ratios of motive power distribution between the engine and the motor-generator;

calculating the first and second fuel consumptions at a plurality of ratios of motive power distribution; and determining the distribution of motive power between the engine and the motor-generator from one of the plurality of ratios for a minimum sum of the first and second fuel consumptions.

10. The drive control method of claim 9, further comprising:

operating the engine and the motor-generator to drive one and the other of a front axle for a pair of front wheels and a rear axle for rear wheels, respectively, based on a determined distribution of motive power.

* * * * *